United States Patent [19]

Okamoto et al.

[11] Patent Number: 4,682,332
[45] Date of Patent: Jul. 21, 1987

[54] METHOD AND APPARATUS FOR RECORDING DIGITAL SIGNALS

[75] Inventors: Hiroo Okamoto; Masaharu Kobayashi; Takaharu Noguchi; Takao Arai, all of Yokohama, Japan

[73] Assignee: Hitachi, Ltd., Tokyo, Japan

[21] Appl. No.: 694,658

[22] Filed: Jan. 24, 1985

[30] Foreign Application Priority Data

Jan. 25, 1984 [JP] Japan .................................. 59-10098

[51] Int. Cl.⁴ ............................................ G06F 11/10
[52] U.S. Cl. ...................................... 371/38; 371/47; 360/32
[58] Field of Search ............... 371/37, 38, 47; 360/32; 369/59

[56] References Cited

U.S. PATENT DOCUMENTS

| | | | |
|---|---|---|---|
| 3,753,228 | 8/1973 | Nickolas | 371/47 |
| 4,208,650 | 6/1980 | Horn | 371/47 |
| 4,282,551 | 8/1981 | Kanazawa | 371/38 X |
| 4,447,902 | 5/1984 | Wilkinson | 371/37 X |
| 4,453,250 | 6/1984 | Moshimi | 371/38 X |
| 4,516,163 | 5/1985 | Masuda | 360/32 |

OTHER PUBLICATIONS

Edward R. Reins "Error-Free Digital Communication System", Navy Tech. Cat. No. 0781, 9/1980, pp. 15-22.

Primary Examiner—Jerry Smith
Assistant Examiner—Robert W. Beausoliel, Jr.
Attorney, Agent, or Firm—Antonelli, Terry & Wands

[57] ABSTRACT

Error detection/correction codes appended to a recording signal for a PCM recorder are so arranged as to ensure detection and/or correction of a dropout or error of a data block address in the reproduction of the recording signal. In recording digital signals on a recording medium, the digital signals are formatted in n-word blocks, each block further including a sync signal for providing a reference timing for the reproduction of the signal, control data related to the digital signals, a data block address for identifying the block of n-words, an error detection code for detecting an error in the control data and the block address, and an error detection/correction code for error detection and/or correction for the block address and the n-words. A recording system includes an error detection/correction code generating circuit which generates error detection/correction codes using a Reed Solomon code or b-adjacent code. The generated error detection/correction codes are combined by a multiplexer so that a recording signal is arranged, and recorded on the recording medium.

7 Claims, 12 Drawing Figures

FIG. 4
PRIOR ART $$\begin{pmatrix} 1 & 1 & 1 & 1 & 1 & 1 & 1 & 1 & 1 & 1 & 1 & 1 & 1 & 1 & 1 & 1 & 1 & 1 \\ \alpha^{17} & \alpha^{16} & \alpha^{15} & \alpha^{14} & \alpha^{13} & \alpha^{12} & \alpha^{11} & \alpha^{10} & \alpha^{9} & \alpha^{8} & \alpha^{7} & \alpha^{6} & \alpha^{5} & \alpha^{4} & \alpha^{3} & \alpha^{2} & \alpha & 1 \end{pmatrix} \begin{pmatrix} W_0 \\ W_1 \\ W_2 \\ W_3 \\ W_4 \\ W_5 \\ W_6 \\ W_7 \\ W_8 \\ W_9 \\ W_{10} \\ W_{11} \\ W_{12} \\ W_{13} \\ W_{14} \\ W_{15} \\ P_0 \\ P_1 \end{pmatrix} = \begin{pmatrix} 0 \\ 0 \end{pmatrix}$$

FIG. 5

$$\begin{pmatrix} 1 & 1 & 1 & 1 & 1 & 1 & 1 & 1 & 1 & 1 & 1 & 1 & 1 & 1 & 1 & 1 & 1 & 1 & 1 \\ \alpha^{18} & \alpha^{17} & \alpha^{16} & \alpha^{15} & \alpha^{14} & \alpha^{13} & \alpha^{12} & \alpha^{11} & \alpha^{10} & \alpha^{9} & \alpha^{8} & \alpha^{7} & \alpha^{6} & \alpha^{5} & \alpha^{4} & \alpha^{3} & \alpha^{2} & \alpha & 1 \end{pmatrix} \begin{pmatrix} ADR. \\ W_0 \\ W_1 \\ W_2 \\ W_3 \\ W_4 \\ W_5 \\ W_6 \\ W_7 \\ W_8 \\ W_9 \\ W_{10} \\ W_{11} \\ W_{12} \\ W_{13} \\ W_{14} \\ W_{15} \\ P_0 \\ P_1 \end{pmatrix} = \begin{pmatrix} 0 \\ 0 \end{pmatrix}$$

RECORDING UNIT

METHOD AND APPARATUS FOR RECORDING DIGITAL SIGNALS

The present invention relates to a method and apparatus for recording digital signals and, particularly, to a method and apparatus for arranging error detection/correction codes suitable for block address protection in recording information on a PCM recorder.

PCM audio recorders, in which an analog signal is converted into a digital signal and then recorded on a recording medium such as a magnetic tape, provide significantly improved sound quality as compared with the conventional analog signal tape recorders. However, the transmission rate is increased by about 50 times, and it is necessary to accomodate this increase in the transmission rate by increasing the number of recording tracks or increasing the relative tape speed with respect to the recording head through the use of a rotary head.

FIG. 1 shows a record pattern produced by a PCM recorder of the type of rotary-head digital audio tape (R-DAT) system. This type of PCM recorder operates to record signals on a tape 1 with a rotary head so that recording tracks 2 are formed aslant on the tape 1. On each track 2, several blocks of data, each block being made up of several words, are recorded. For example, one block is formed of 16 words, and 256 blocks of data are recorded on one track. Reference number 3 denotes a block on a track.

FIG. 2 shows a record pattern produced by a PCM recorder having a the type of multi-track system. This type of PCM recorder operates to record data divisionally on several tracks, e.g., 20 tracks, on a tape 1. On each track 2, data is subdivided into blocks 3, each made up of several words, e.g., 16 words.

FIG. 3 shows the format of a data block used in the R-DAT and the multi-track PCM recorder. The R-DAT block format is described in detail, for example, in "Electronics", Vol. 24, No. 10, pp. 36-42, particularly page 42, published in 1984 by EIAJ (Electronic Industries Association of Japan). The block format shown in FIG. 3 includes a synchronizing (sync) signal 4 providing a reference timing for the playback operation, control and display signals 5 (simply referred to as control signal or C&D), also called identify code, carrying PCM-related information such as the sampling frequency and the number of quantization bits, a block address (ADR) 6 indicating the order of reproduction in the playback operation, and a block PCM signal 8 including 16 words of data $W_0$–$W_{15}$. The block address consists of for example, 8 bits. Block addresses 1 to 255 are added to 256 blocks in a track, respectively, whereby which number block is in the track is identified in the R-DAT, and the relative block position in each track is identified in the multi-track PCM recorder. The format is further provided with an error detection code ($P_c$) 7 associated with the control signal 5 and block address 6 and evaluated, for example, through an exclusive-OR operation between the codes 5 and 6, i.e., $P_c = C\&D \oplus ADR$, to form a simple parity code, and another error detection/correction code pair ($P_0$, $P_1$) 9 associated with the PCM signals 8 based, for example, on the Reed-Solomon code—described in a Japanese literature "Theory of code", by Miyagawa et al., published by Shokodo. Thus, the values of $P_0$ and $P_1$ are determined to meet a parity check matrix H shown in FIG. 4, where $\alpha$ is a primitive root of the Galois field.

As mentioned above, besides the error detection code 9 appended to the PCM signals 8, another error detection code 7 is appended for the control signals 5 and block address 6, whereby the accuracy of reproducing the PCM signal can be enhanced. However, such a brief error detection scheme based on a simple parity code can possibly result in misdetection of an error. For example, using an 8-bit parity code, the probability of misdetection is as high as $\frac{1}{2}^8 - 1$, or 1/255. Particularly, if an error occurs in the block address 6, the order of data is disturbed, resulting in an improper deinterleaving of the PCM signal. Such improper deinterleaving causes the creation of abnormal sound such as a click noise in a digital audio reproducing system.

It is therefore, an object of the present invention to provide a method and apparatus for arranging error detection/correction codes which effectively protect the block address of data recorded on a PCM recorder without increasing the redundancy of the PCM data.

Another object of the present invention is to provide a method of arranging error detection/correction codes for a PCM audio system which is capable of preventing the creation of abnormal sound caused by incorrect deinterleaving of reproduced data even if the block address is reproduced erroneously.

In a PCM signal recording method according to an aspect of the present invention, error detection codes are appended to the control signals and the block address, and error detection/correction codes, such as a Reed-Solomon code and b-adjacent code, appended to PCM signals are made to include the block address. As a consequence, when error detection by the error detection codes appended to the block address has failed during the playback operation and the order of data has been disturbed, the following error detection/correction processings for the PCM signal can detect the disturbance, thereby preventing the disorderly data, namely, incorrectly deinterleaved data from being sent out of the system, or preventing an erroneous correction which would be caused by error correction using disorderly de-interleaved data. In the playback operation, even if the failure of detecting the block address occurs in the first error checking operation, it can be detected or detected and corrected in the subsequent error checking, whereby the creation of abnormal sound can be prevented in the digital audio system utilizing the error concealment by the previous value holding or the mean value interpolation which is effected by an error flag added to the data.

The objects, features and advantages of the present invention will become apparent from the following detailed description taken in conjunction with the accompanying drawings.

FIG. 4 is a diagram showing a matrix for generating an error check/correction code according to the conventional method;

FIG. 5 is a diagram showing a matrix for generating an error check/correction code implemented by the present invention;

An embodiment of the present invention will now be described with reference to FIG. 5. The figure shows a matrix for generating the error detection/correction codes 9 shown in FIG. 3. The error detection/correction codes $P_0$ and $P_1$ are determined from the block address 6 and PCM signal 8 so that the matrix of FIG. 5 is satisfied. In generating the codes $P_0$ and $P_1$, error syndromes $S_0$ and $S_1$ are calculated as follows.

$$S_0 = ADR + W_0 + W_1 + \ldots + W_{15}$$

$$S_1 = \alpha^{18} ADR + \alpha^{17} W_0 + \alpha^{16} W_1 + \ldots + \alpha^2 W_{15}$$

FIG. 5 gives $$P_0 = \frac{S_0 + S_1}{1 + \alpha}$$

$$P_1 = \frac{\alpha S_0 + S_1}{1 + \alpha}$$

Accordingly, $P_0$ and $P_1$ can be determined by calculating the above equations.

By making the error detection/correction code generating block to include the block address 6, even if the error detection code 7 has failed to detect an error due to an erroneous block address 6, the error can be detected by the following error detection using the error detection/correction codes 9.

Figure 6:
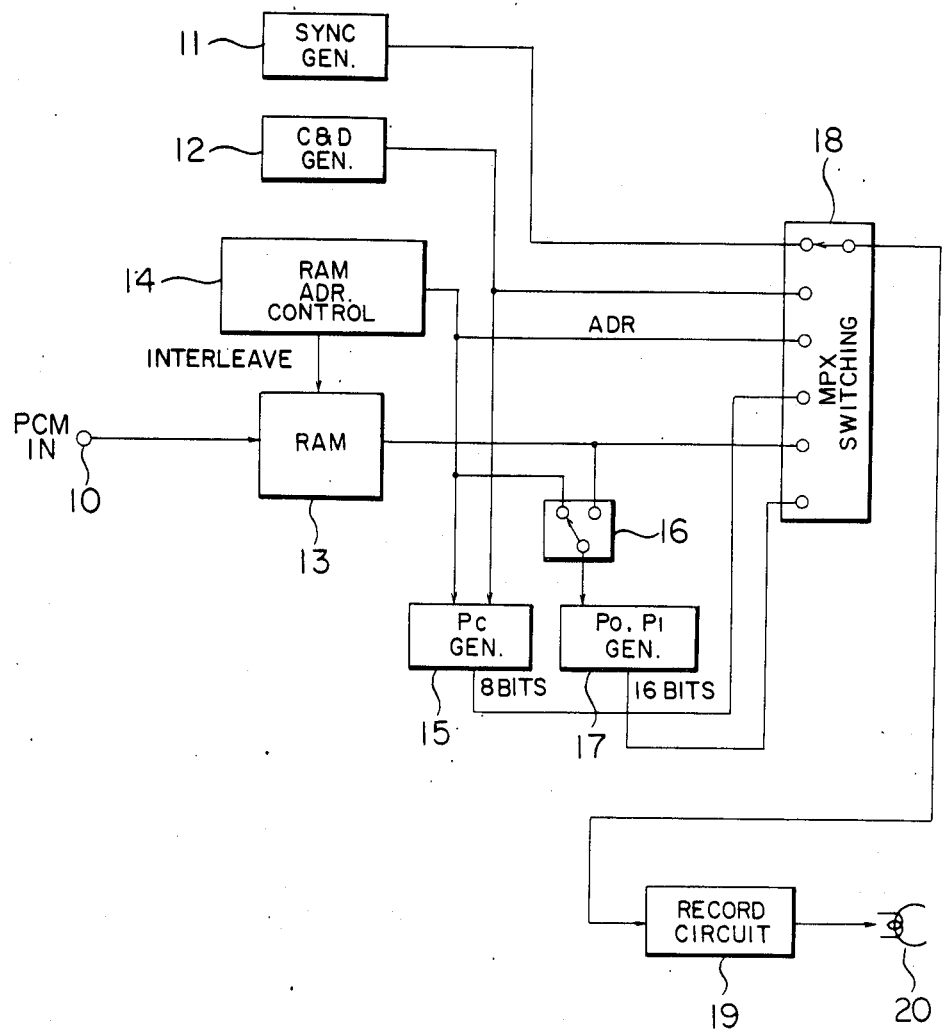
FIG. 6 is a block diagram showing a digital signal recording system according to an embodiment of the present invention.

FIG. 6 shows an example of the PCM signal recording system according to the present invention. The arrangement includes a synchronizing (sync) signal generator 11, a control signal generator 12, a random-access memory (RAM) 13 used for partitioning and interleaving the digital signal, a memory address controller 14, an error detection signal ($P_c$) generator 15, an error detection/correction code ($P_0$, $P_1$) generator 17, signal switching circuits 16 and 18 formed of multiplexers or the like, and a recording circuit 19 for providing a recording signal to a magnetic recording head 20.

A PCM signal 8 entered through an input terminal 10 is stored in the RAM 13, and thereafter it is read out of the RAM 13 in the order of $W_0, W_1, \ldots, W_{15}$ for recording. An address controller 14 produces an address signal for making access to the RAM 13, and it also produces the block address 6 based on the RAM address for reading out the PCM signal 8. The $P_c$ generator 15 produces an error detection code $P_c$ from a control signal 5 provided by the control signal generator 12 and a block address 6 provided by the address controller 14. The $P_0/P_1$ generator 17 produces error detection/correction codes $P_0$ and $P_1$ from the block address 6 and the PCM signal 8 read out of the RAM 13. The switching circuit 18 selects the outputs of these signal generating circuits sequentially to form a complete block of data as shown in FIG. 3.

Figure 1:
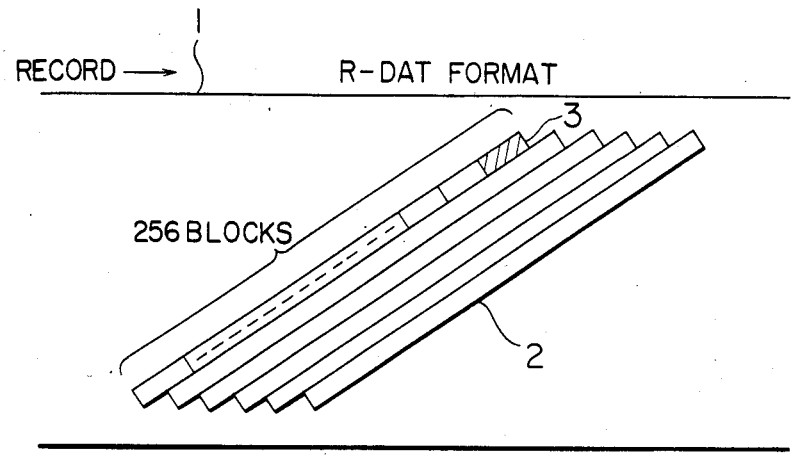
FIG. 1 is an illustration showing a record pattern produced by the conventional rotary-head PCM recorder.
Figure 2:
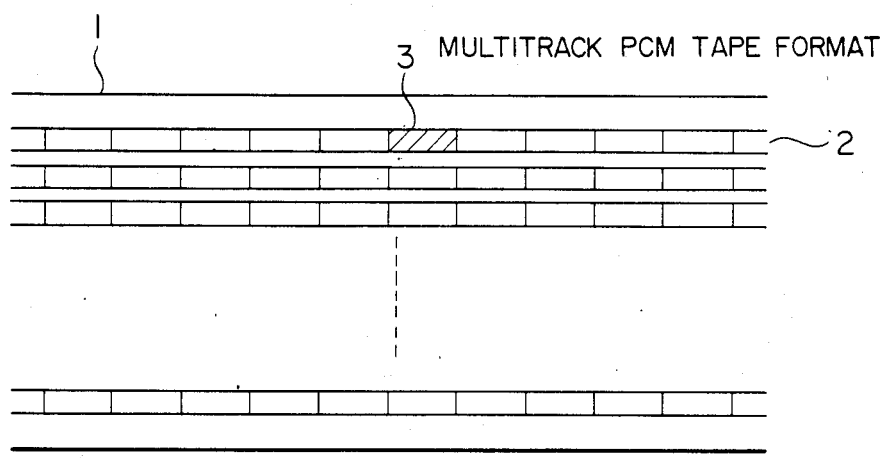
FIG. 2 is an illustration showing a record pattern produced by the conventional multi-track PCM recorder.
Figure 3:
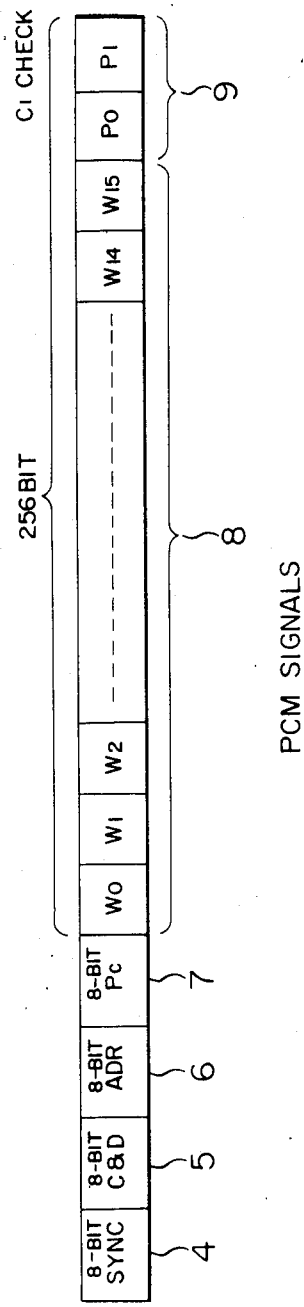
FIG. 3 is a diagram showing the format of data block used in the PCM recorder.

In recording the signal switching circuit 18 selects the outputs of the sync signal generator 11, control signal generator 12, address controller 14 (block address), and the $P_c$ generator 15 sequentially, and delivers the data 4 through 7 in FIG. 3 to the recording circuit 19. At this time, the signal switching circuit 16 selects the block address from the address controller 14, and it is entered to the $P_0/P_1$ generator 17. Subsequently, the signal switching circuit 18 selects the output of the RAM 13 so that the PCM signal is read out in the order of $W_0, W_1, \ldots, W_{15}$. At this time, the signal selection circuit 16 selects the output of the RAM 13, and the $P_0/P_1$ generator 17 is also supplied with the same PCM signal. The circuit 17 produces the $P_0$ and $P_1$ upon receipt of the last word $W_{15}$. Finally, the signal switching circuit 18 selects the output of the $P_0/P_1$ generator 17 and delivers the $P_0$ and $P_1$ codes to the recording circuit 19. The PCM data interleaving method using RAM 13 and address controller 14 may be as disclosed in for example, T. Arai et al. "DIGITAL AUDIO/VIDEO COMBINATION RECORDER USING CUSTOM MADE LSI's, IC's", 69th AES Convention, No. 1791 (B-6), May 1981, and S. Ohashi et al., "AN EFFECTIVE RAM ACCESSING METHOD FOR TCM PROCEJS.NG SYSTEMS", 68th AES Convention, No. 1726 (D-4), March 1981.

Figure 7:
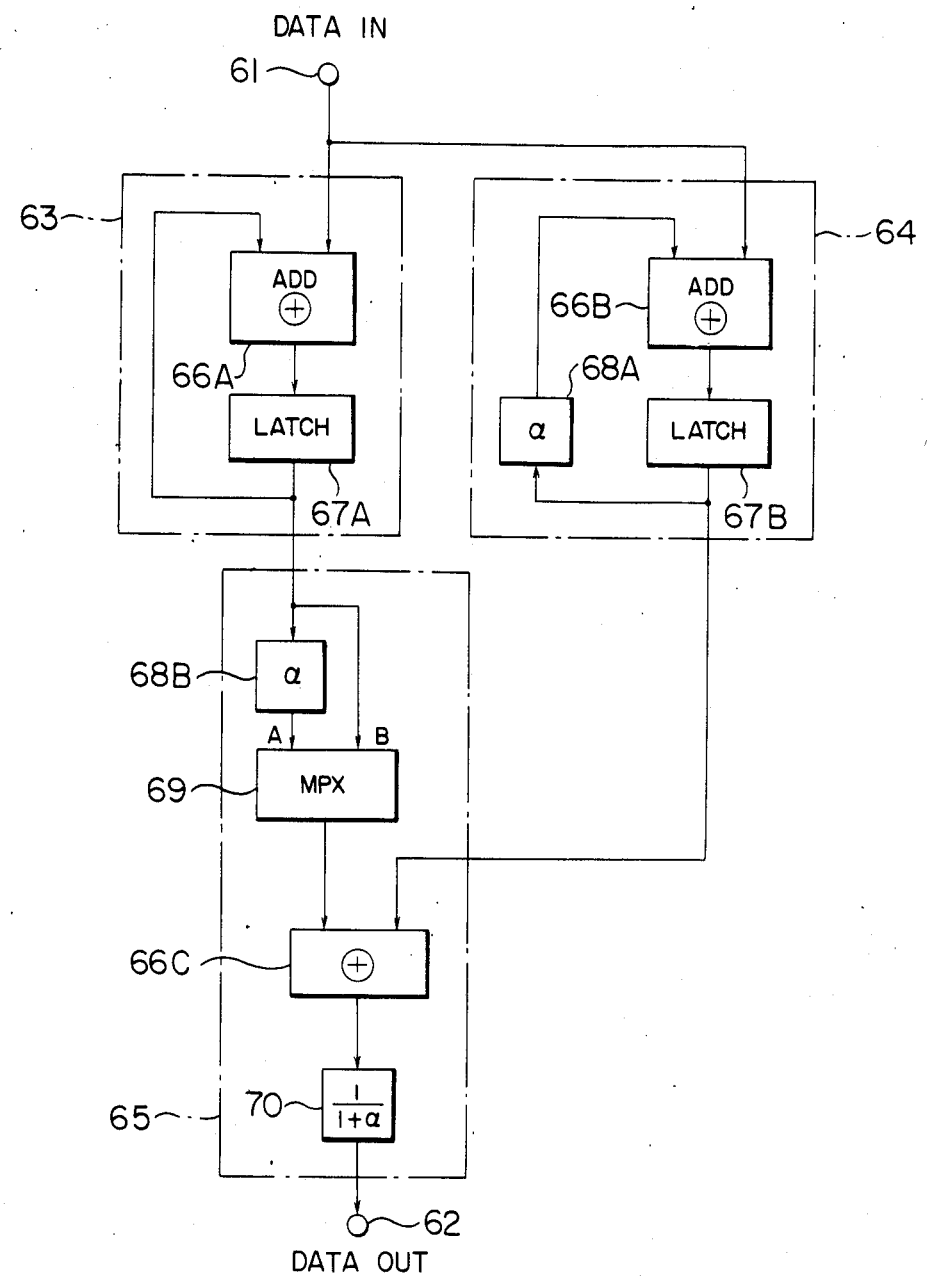
FIG. 7 is a block diagram showing in detail the signal processing circuit shown in FIG. 6.

FIG. 7 shows in detail an example of the $P_0/P_1$ generator 17. The arrangement includes an $S_0$ generator 63, a $S_1$ generator 64, an arithmetic and logic (ALU) circuit 65, mod-2 adders 66A, 66B and 66C each formed of an EX-OR gate, latch circuits 67A and 67B, scale multipliers 68A and 68B performing multiplication between the input value and the values of $\alpha$ and $1/(1+\alpha)$, respectively, and a signal switching circuit 69.

Input data entered through an input terminal 61 is fed to the $S_0$ generator 63 and $S_1$ generator 64, and after the addition operation by the respective adders 66A and 66B the results are held in the latch circuits 67A and 67B. Through these operations, error syndromes $S_0$ and $S_1$ are calculated in accordance with the expressions shown previously. The ALU circuit 65 performs computation for obtaining the value of $P_0$ or $P_1$ from the $S_0$ and $S_1$. The circuit 65 calculates $P_0$ when the signal switching circuit 69 selects an input A, or calculates $P_1$ when an input B is selected. The recording signal arranged in a block as shown in FIG. 3 is further processed for modulation and the like by the recording circuit 19, and then is recorded on the magnetic tape by the recording head 20.

Figure 8:
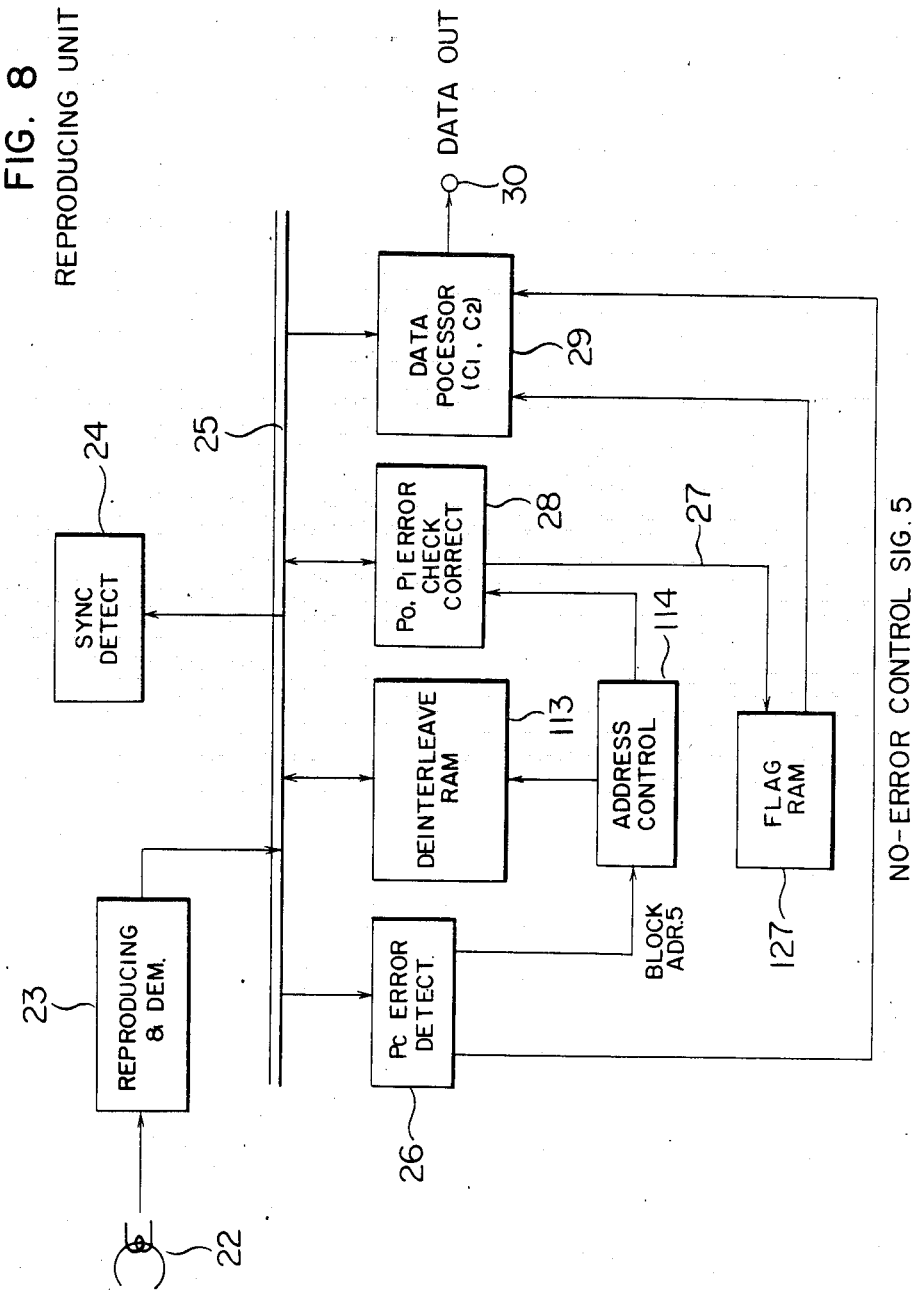
FIG. 8 is a schematic block diagram showing a reproducing system used to reproduce a record which has been recorded by the present recording method.

FIG. 8 shows an example of PCM signal reproducing system used to reproduce PCM signals that have been recorded as described above. The arrangement includes a playback head 22, a playback demodulator 23, a sync signal detector 24, an error detection circuit 26, an error flag register (RAM) 127, an error correction circuit 28, and a signal processing circuit 29.

The digital signal picked up by the playback head 22 is processed for amplification and demodulation by the playback demodulator 23, and then is fed through a bus 25 to the sync detection circuit 26, error detection circuit 24 and de-interleaving RAM 113. The sync signal detector operates to detect the sync signal 4 which provides the reference timing for the successive reproducing operation. The error detection circuit 26 receives the control signal 5, block address 6 and error detection code 7 and performs error detection based on the error detection code 7. If the circuit 26 detects no error, the control signal 5 is sent to the signal processing circuit 29, and the block address 6 is sent to the address control circuit 114. The address control circuit 114 specifies the address of the RAM 113 for holding the PCM signal 8 and error detection/correction code 9 in accordance with the block address. The PCM signal 8 and error detection/correction codes 9 held in the memory 113 are thereafter read out into the error detection/correction circuit 28. At the same time, the block address is produced from the address of memory 113, and it is fed to the error detection/correction circuit 28. Error detection is carried out using the error detection/correction codes 9, and if an error is detected and it is found correctable, error correction is carried out successively. If the error is found to be uncorrectable, an error detection flag 27 is set to the flag memory 127 from circuit 28. Following the processing by the error detection/correction circuit 28, the PCM signal 8 is sent from the RAM 113 to the signal processing circuit 29, in which the signal is subjected to error concealment using the error detection flag 27 and processing by the control signal 5, and then the finished signal is delivered to an output terminal 30. In case the second error detection/correction codes $Q_0$–$Q_3$ are appended to the PCM signal in addition to the first error correcting processing ($C_1$ decoding) using the codes $P_0$ and $P_1$, the signal processing circuit 29 performs the second error correcting processing ($C_2$ decoding) using the second error detection/correction codes and the error detection flag.

If an error is detected by the error detection circuit 26 based on the error detection code $P_0$, the control signal 5 and block address 6 are not produced. In another case, if an error has been left undetected, and erroneous control signal 5 or block address 6 will be sent out. This problem can be overcome for the control signal by placing the same information in several blocks as disclosed in the present inventors' copending U.S. application Ser. No. 685,551, entitled "PCM DATA RECORDING SYSTEM" filed Dec. 24, 1984 based on Japanese patent application Nos. 58-243859 and 58-243858 filed Dec. 26, 1983 and No. 59-1923 filed Jan. 11, 1984 which is incorporated by reference in this application, but it is not possible for the block address 6 because each block has a different value. On this account, if a correct block address 6 cannot be obtained, a presumed block address is produced based on the previously reproduced block address. If the presumed block address is erroneous, or if a block address including an undetected error is given to the address control circuit 114, the PCM data will be held at an erroneous location of the RAM 113, resulting in the reproduction of a disorderly signal i.e., incorrectly deinterleaved data. In actual practice, however, the error detection/correction codes 9 are generated inclusive of the block address 6, and an erroneous block address can be detected in the error detecting processing by the error detection/correction circuit 28. Assuming the block address to be 8 bits and the $P_0$/$P_1$ codes to be 8 bits each, the error detection capability is enhanced significantly as evaluated to be $1/255 \times 1/255^2$. Data held at an erroneous location of the RAM 113 is appended with an error detection flag, whereby disorderly data can be prevented from being sent out without correction, or miscorrection due to the second correcting process for disorderly data can be prevented.

Figure 9:
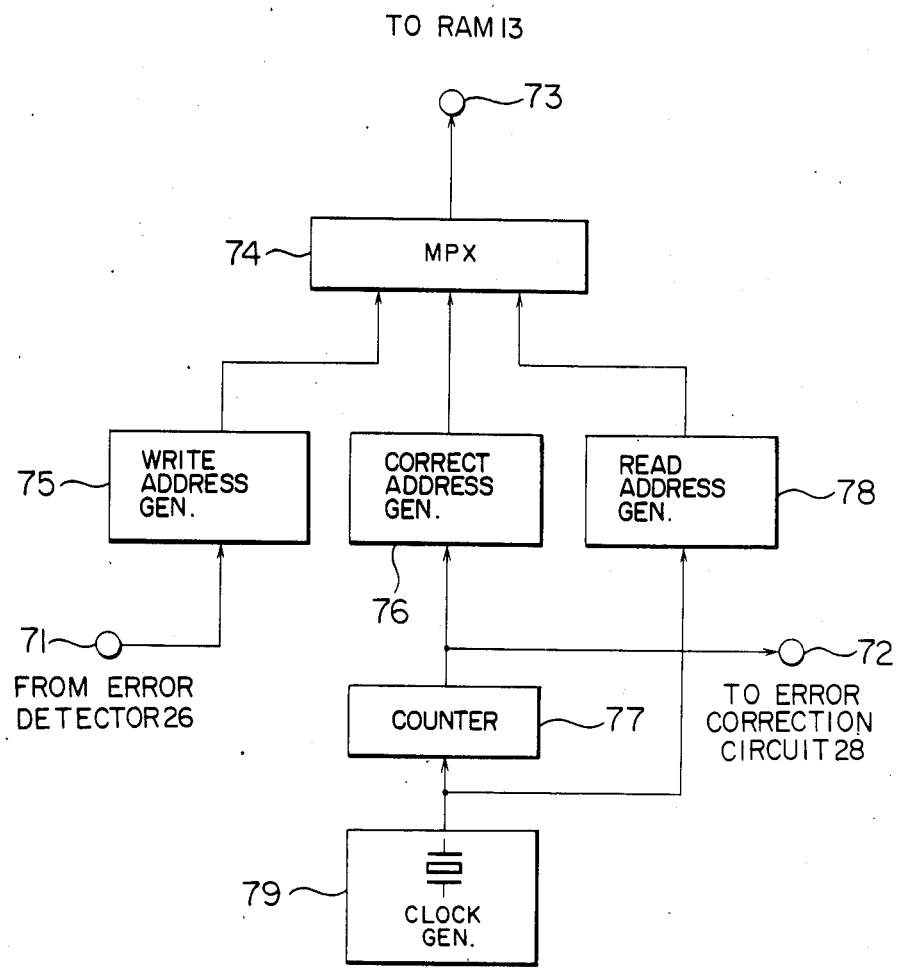
FIG. 9 is a block diagram showing in detail the address control circuit in the reproducing system shown in FIG. 8.

FIG. 9 exemplifies the arrangement of the address control circuit 114, which includes an address switching circuit 74, a write address generator 75, a correcting address generator 76, and a block address generator formed of a counter 77, a read address generator 78 and a clock generator 79. The write address generator 75 generates the address of the memory 113 for storing the PCM signal 8 and error detection/correction code 9 by making reference to the block address 6 supplied at the input terminal 71. The correction address generator 76 generates the address of the RAM 113 for reading out the PCM signal 8 and error detection/correction codes 9 into the error correction circuit 28 by making reference to the block address generated by the counter 77. The read address generator 78 generates the address of the RAM 113 for reading out the PCM signal 8 into the signal processing circuit 29. In storing reproduced data, carrying out error correction, or reading out data, the address switching circuit 74 effects a switching operation to sequentially output addresses generated by the address generators to the RAM 113. In the error correction procedure, the block address generated by the counter 77 is fed through the output terminal 72 to the error correction circuit 28, which then performs error detection and correction using the block address, PCM signal 8 and error detection/correction codes 9 read out of the RAM 113.

Figure 10:
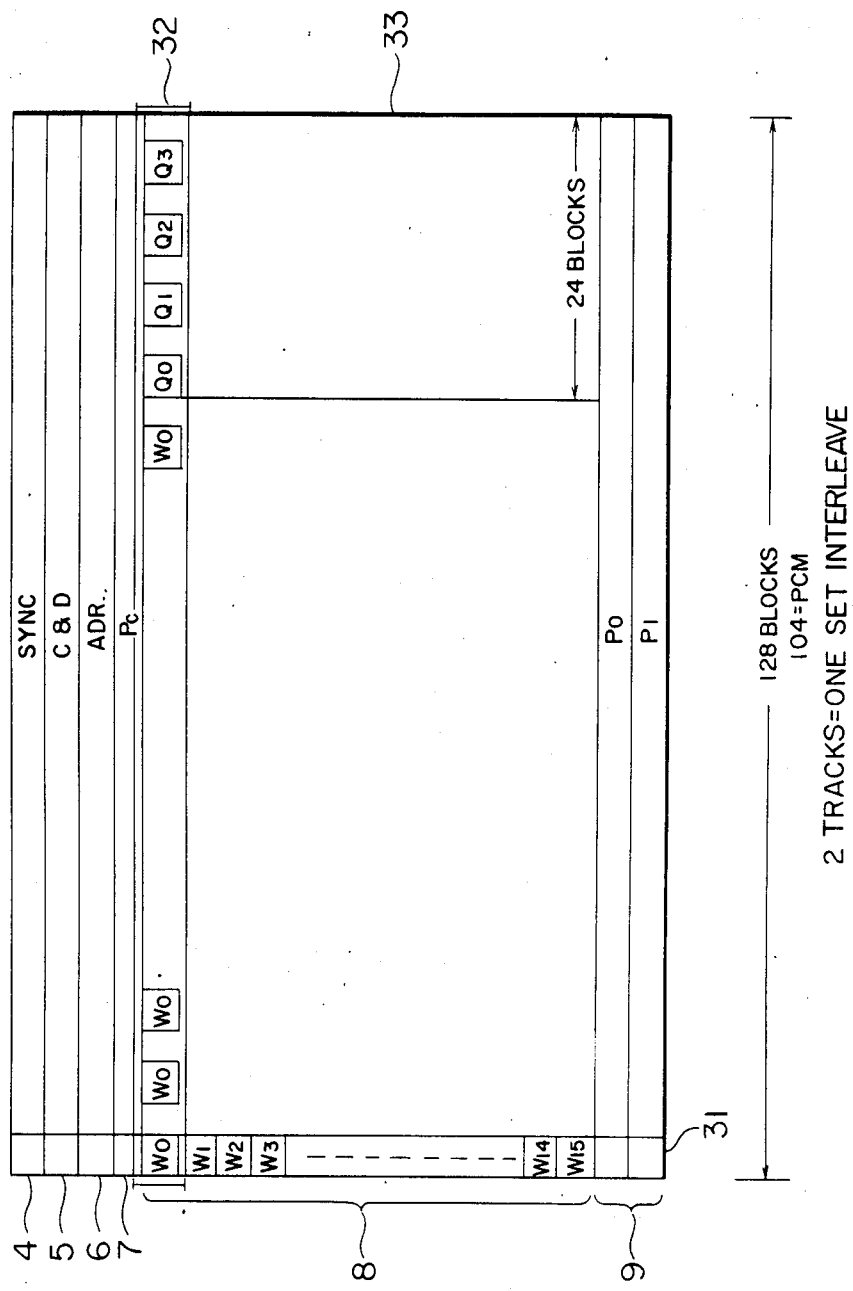
FIG. 10 is an illustration showing the recording format of the rotary-head PCM recorder.
Figure 11:
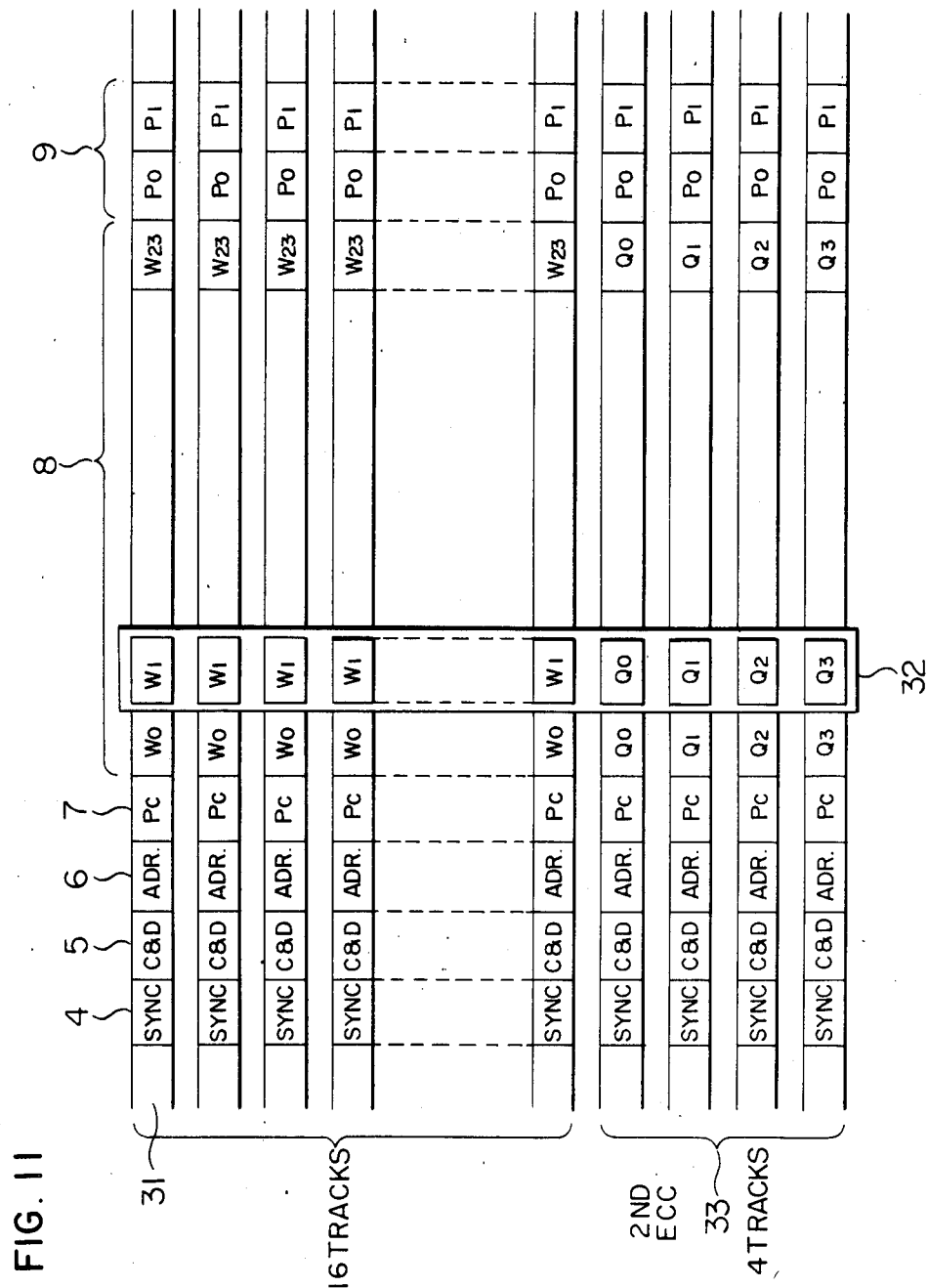
FIG. 11 is an illustration showing the recording format of the multi-track PCM recorder.

FIGS. 10 and 11 show other embodiments of the present invention further applying the second error detection/correction code format. FIG. 10 is the code format for a R-DAT, showing one track of data (e.g., 256 blocks of data) with a block as shown in FIG. 3 referred to by 31. The second error detection/correction codes $Q_0$, $Q_1$, $Q_2$ and $Q_3$ are recorded in section 33, i.e., a certain block 8, and the second code block is made up of, for example, 12-word PCM signal and error detection/correction codes $Q_0$–$Q_3$ as shown by 32.

FIG. 11 is the code format for a multi-track PCM recorder, in which the PCM signal is formatted in 24-word blocks. The second error detection/correction codes are recorded in section 8 of certain tracks, so that the second code block is formed in the tape transverse direction, using for example, PCM signals on 16 tracks and error detection/correction codes $Q_0$–$Q_3$ on four tracks.

Figure 12:
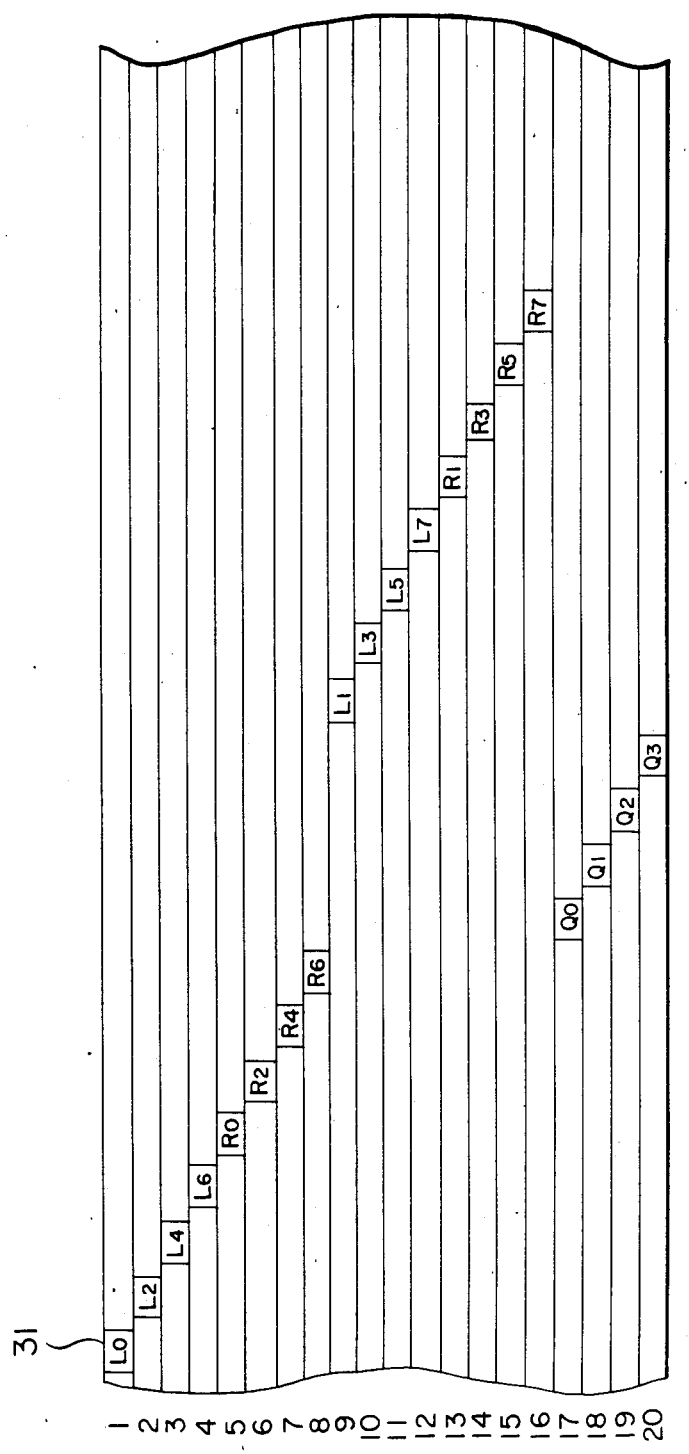
FIG. 12 is an illustration showing the interleaving format of the multi-track PCM recorder.

FIG. 12 shows the interleaving for the code format of FIG. 11. In the diagram, each segment represents a block as shown by 31 in FIG. 11, and the second code block as shown by 32 in FIG. 11 is formed by data included in blocks $L_0$, $L_1$, ..., $L_7$, $R_0$, $R_1$, ..., $R_7$, $Q_0$, $Q_1$, $Q_2$ and $Q_3$. By interleaving the second error detection/correction codes, burst errors caused by a dropout and the like can be easily treated using error concealment.

As described above, the capability of error detection and error correction can be enhanced through the use of the second error detection/correction codes $Q_0$–$Q_3$ in addition to the first error codes $P_0$ and $P_1$ and through the interleaving thereof. However, if the order of blocks 31 is disturbed due to the erroneous block address, the second code block will erroneously include data of another code block, resulting possibly in miscorrection in the second error correction. Whereas, the present method uses the error detection flag appended to data of a different code block, allowing the detection of that data in the second correction processing, whereby miscorrection can be prevented.

We claim:

1. A method of recording digital signals which are divided into blocks each having n digital signals (where n is a positive integer), a synchronizing signal providing a reference timing for reproduction, a control signal related to said digital signals, an identification signal for identifying the address of a block, an error detection code for detecting an error in said control signal and said identification signal, and an error detection and correction code for detecting and/or correcting an error in said n digital signals and said identification signal, said method comprising the steps of:
   generating a first error detection code by performing an algebraic operation on said control signal and said identification signal in each block;
   generating a second error detection and correction code by performing an algebraic operation on said digital signals and said identification signal in each block; and
   combining said generated first error detection code and said generated second error detection and correction code together with the remaining signal in said block to form a recording block.

2. A digital signal recording method according to claim 1, wherein said first error detection code is obtained through modulo-2 addition of said control signal and said identification signal, and wherein said second error detection and correction code for said n digital signals is a Reed-Solomon code or b-adjacent code.

3. A method of processing digital signals to be recorded comprises the steps of:
   (a) partitioning said digital signals into blocks of n data words (n is a positive integer), and appending at the beginning of each block a synchronizing signal for providing a reference timing for a reproduction operation, a control signal representing control data related to said digital signals, and a block address signal for identifying the address of a block;
   (b) extracting an error detection parity word by performing an algebraic operation on said control signal and said block address signal, and arranging said parity word successively to said block address signal; and
   (c) extracting error detection and correction code words for detecting and/or correcting at least an error word in said data words by performing an algebraic operation on said block address signal and said n data words in each block, and appending said extracted error detection and correction code words to said n data words, whereby the error detection word for the block address signal of each block is repeatedly added without increasing the number of detection words.

4. A digital signal processing method according to claim 3, wherein said data blocks are recorded sequentially on separate tracks or same tracks.

5. An apparatus for recording digital signals comprising:
   (a) a random access memory (RAM) for storing input digital signals;
   (b) address control means for controlling read and write operations of said RAM to divide said input digital signals into blocks of data words, and for generating a block address for identifying a respective one of said blocks in response to the reading of said RAM;
   (c) synchronizing signal generating means for generating a synchronizing signal appended at the beginning of each block for providing a reference timing for reproduction;
   (d) control data generating means for generating control data related to said input digital signals;
   (e) error detection word generating means for generating an error detection parity word for each block address and each control data by algebraic operation on a block address from said address control means and control data from said control data generating means;
   (f) error detection and correction word generating means for generating error detection and correction words for detecting and/or correcting errors in data words and a block address of each block by algebraic operation on the data word from said RAM and the block address from said address control means; and
   (g) multiplexer means or sequentially selecting and combining the outputs of said synchronizing signal generating means, said control data generating means, said address control means, said error detection word generating means, said RAM, and said error detection and correction word generating means, so as to arrange a respective data block for a record output.

6. A digital signal recording apparatus according to claim 5 comprising means including a modulation circuit and a recording head for modulating signals of a data block provided by said multiplexer means and for recording the modulated signal on a recording medium.

7. A digital signal recording apparatus according to claim 6, wherein said recording medium comprises a magnetic tape, and said recording head comprises a multi-track head or rotary head.

* * * * *